(12) United States Patent
Ruhland et al.

(10) Patent No.: US 10,293,294 B2
(45) Date of Patent: May 21, 2019

(54) AIR FILTER SYSTEM AND AIR FILTER ELEMENT FOR AN AIR FILTER SYSTEM

(71) Applicant: MANN+HUMMEL GMBH, Ludwigsburg (DE)

(72) Inventors: Klaus-Dieter Ruhland, Meckenheim (DE); Michael Kaufmann, Meckenheim (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 197 days.

(21) Appl. No.: 15/333,479

(22) Filed: Oct. 25, 2016

(65) Prior Publication Data

US 2017/0036155 A1 Feb. 9, 2017

Related U.S. Application Data

(63) Continuation of application No. 14/474,386, filed on Sep. 2, 2014, now Pat. No. 9,511,317.
(Continued)

(30) Foreign Application Priority Data

Sep. 2, 2013 (DE) .................. 10 2013 014 488
Sep. 2, 2013 (DE) .................. 10 2013 014 489
(Continued)

(51) Int. Cl.
*B01D 46/00* (2006.01)
*B01D 46/52* (2006.01)
(Continued)

(52) U.S. Cl.
CPC ...... *B01D 46/0086* (2013.01); *B01D 46/0001* (2013.01); *B01D 46/0002* (2013.01);
(Continued)

(58) Field of Classification Search
CPC ............ B01D 46/0002; B01D 46/0004; B01D 46/0005; B01D 46/0024; B01D 46/0046;
(Continued)

(56) References Cited

U.S. PATENT DOCUMENTS 4,261,710 A 4/1981 Sullivan
4,720,292 A 1/1988 Engel et al.
(Continued)

FOREIGN PATENT DOCUMENTS

DE 202005001693 U1 6/2006
DE 102008062954 A1 7/2010
(Continued)

*Primary Examiner* — Robert Clemente
(74) *Attorney, Agent, or Firm* — James Hasselbeck

(57) ABSTRACT

A filter system for intake air of an internal combustion engine has a housing with a cover. A filter element is arranged in the housing. An inlet feeds a medium to be filtered into the housing and an outlet discharges the medium from the housing. The filter element has a filter body with first end face and opposite second end face. The filter element has an open first end plate at the first end face and a second end plate at the second end face. A support tube is arranged concentrically about a longitudinal axis in the housing and attached with a first end to the housing. The support tube is arranged in the interior of the filter element and radially supports the filter body. The second end plate rests on the second end of the support tube and on an inner cover contour of the cover with anti-rotation action.

15 Claims, 8 Drawing Sheets

Related U.S. Application Data

(60) Provisional application No. 62/038,312, filed on Aug. 17, 2014, provisional application No. 62/038,575, filed on Aug. 18, 2014, provisional application No. 62/038,601, filed on Aug. 18, 2014, provisional application No. 62/038,920, filed on Aug. 19, 2014, provisional application No. 62/038,672, filed on Aug. 18, 2014, provisional application No. 62/038,869, filed on Aug. 19, 2014.

(30) Foreign Application Priority Data

| | | |
|---|---|---|
| Sep. 2, 2013 | (DE) | 10 2013 014 491 |
| Sep. 2, 2013 | (DE) | 10 2013 014 492 |
| Sep. 2, 2013 | (DE) | 10 2013 014 493 |
| Sep. 2, 2013 | (DE) | 10 2013 014 507 |

(51) Int. Cl.
  *F02M 35/024* (2006.01)
  *F02M 35/02* (2006.01)
  *F02M 35/022* (2006.01)
  *F02M 35/09* (2006.01)
  *B01D 46/24* (2006.01)

(52) U.S. Cl.
  CPC ..... *B01D 46/0004* (2013.01); *B01D 46/0005* (2013.01); *B01D 46/0021* (2013.01); *B01D 46/0027* (2013.01); *B01D 46/0046* (2013.01); *B01D 46/2411* (2013.01); *B01D 46/2414* (2013.01); *B01D 46/521* (2013.01); *B01D 46/522* (2013.01); *F02M 35/0203* (2013.01); *F02M 35/024* (2013.01); *F02M 35/0216* (2013.01); *F02M 35/0223* (2013.01); *F02M 35/02416* (2013.01); *F02M 35/02483* (2013.01); *F02M 35/09* (2013.01); *B01D 2265/021* (2013.01); *B01D 2265/06* (2013.01); *B01D 2279/60* (2013.01); *Y10T 29/49826* (2015.01)

(58) Field of Classification Search
  CPC .......... B01D 46/2411; B01D 2265/021; B01D 2265/026; B01D 46/521; B01D 46/2414; F02M 35/0201; F02M 35/0203; F02M 35/02416; F02M 35/02425; F02M 35/02483

See application file for complete search history.

(56) References Cited

U.S. PATENT DOCUMENTS

| | | |
|---|---|---|
| 5,695,633 A | 12/1997 | Ernst et al. |
| 5,700,304 A | 12/1997 | Foo |
| 5,730,769 A | 3/1998 | Dungs et al. |
| 6,159,261 A | 12/2000 | Binder et al. |
| 6,602,308 B1 | 8/2003 | Carle et al. |
| 6,652,614 B2 * | 11/2003 | Gieseke ............ B01D 46/0004 55/482 |
| 7,090,708 B2 | 8/2006 | Winter et al. |
| 7,390,407 B2 | 6/2008 | Weindorf et al. |
| 8,061,530 B2 | 11/2011 | Kindkeppel et al. |
| 8,555,846 B2 | 10/2013 | Bode |
| 8,784,523 B2 | 7/2014 | Coulonvaux et al. |
| 8,790,431 B2 | 7/2014 | Muenkel et al. |
| 8,852,309 B2 | 10/2014 | Scott et al. |
| 2004/0065206 A1 | 4/2004 | Walker |
| 2007/0240394 A1 | 10/2007 | Ehrenberg |
| 2010/0146917 A1 | 6/2010 | Coulonvaux et al. |
| 2012/0067017 A1 | 3/2012 | Baseotto et al. |
| 2012/0210683 A1 | 8/2012 | Gillenberg et al. |
| 2013/0086877 A1 | 4/2013 | Kori et al. |
| 2013/0232928 A1 | 9/2013 | Heim et al. |

FOREIGN PATENT DOCUMENTS

| | | |
|---|---|---|
| DE | 102014001608 | 8/2014 |
| EP | 1128891 B1 | 9/2001 |

* cited by examiner

AIR FILTER SYSTEM AND AIR FILTER ELEMENT FOR AN AIR FILTER SYSTEM

CROSS-REFERENCE TO RELATED APPLICATIONS

This application of a continuation of U.S. patent application Ser. No. 14/474,386, filed Sep. 2, 2014, which claims the benefit of U.S. provisional patent application Nos. 62/038,312, filed: Aug. 17, 2014; 62/038,575, filed: Aug. 18, 2014; 62/038,601, filed: Aug. 18, 2014; 62/038,920, filed: Aug. 19, 2014; 62/038,672, filed: Aug. 18, 2014 and 62/038,869, filed Aug. 19, 2014. The entire contents of the aforesaid provisional patent applications being incorporated herein by reference and to the fullest extent of the law.

U.S. patent application Ser. No. 14/474,386 claims the benefit of German patent application Nos. 10 2013 014 488.4, filed Sep. 2, 2013; 10 2013 014 489.2, filed Sep. 2, 2013; 10 2013 014 507.4, filed Sep. 2, 2013; 10 2013 014 492.2, filed Sep. 2, 2013; 10 2013 014 491.4, filed Sep. 2, 2013; and 10 2013 014 493.0, filed Sep. 2, 2013. The entire contents of the aforesaid German patent applications being incorporated herein by reference and to the fullest extent of the law.

BACKGROUND OF THE INVENTION

The invention relates to an air filter system, particularly for use as an air filter of an internal combustion engine, and a filter element for installation in such a filter system.

A filter system with a filter element for internal combustion engines is known from WO 2009/047196 A1. This filter system is particularly used for the filtration of the induction air of an internal combustion engine and consists of a housing and a cover for holding the filter element, wherein, by virtue of the design of the seals of the filter element with two toroidal configurations and a sealing groove in-between, a sealing effect, on the one hand, and, on the other hand, an axial support of the filter element in a housing are ensured. Especially when using synthetic material for the seal on elements that are subject to vibrations, a design is required that will also function reliably during extreme temperature fluctuations.

WO 2009/047196 A1 describes furthermore that a secondary element is provided, which is positioned in the interior of a filter element of the filter system. The purpose of the secondary element is keeping the outlet of the filter system closed during the filter element replacement, preventing any contamination from getting into this area while the filter element is being cleaned or replaced. During filter system operation, the purified air flows through the secondary element, which has a fleece layer on a supporting structure. The secondary element is attached to the outlet connection of the outlet by means of a screw thread and at the same time is sealed in this area by means of an O-ring.

In principle it is envisaged to replace the filter elements of air filters after a certain operating time. Depending on the amount of accumulated dust, the service life of an air filter can be only a few days (construction equipment) or up to several months. In this context, the secondary element that is arranged on the clean air side usually remains in the filter system. If the secondary element is also heavily contaminated, however, then it must also be replaced, since otherwise the airflow will be reduced excessively. For this purpose it is particularly important that the filter element and the secondary element are reliably sealed in a housing to ensure safe operation, in order to protect the induction tract of a downstream internal combustion engine against penetration of contamination.

SUMMARY OF THE INVENTION

An object of the invention is therefore to provide a filter system in which a reliable sealing action between the area of the unfiltered medium and the area of the filtered medium is possible, wherein the sealing action is maintained both during operation as well as particularly following the easy replacement of filter element and/or secondary element, and where said sealing characteristics can be restored reliably.

Another object of the invention is to provide a filter element and a secondary element for installation in such a filter system.

According to one aspect of the invention, the above objectives are solved for a filter system in that a filter element with a second end plate which bears on a support tube and/or abuts against an inner cover contour is supported with anti-rotation action, and according to further aspects of the invention is solved by a filter element and a secondary element for installation in such filter system.

Favorable embodiments and advantages of the invention result from the further claims, the description, and the drawing.

A filter system is proposed, comprising a housing with a longitudinal axis, a cover, which closes the housing on one front face, an inlet that is disposed on the housing for feeding a medium to be filtered and an outlet that is disposed on the housing for the drainage of the filtered medium, a replaceable filter element, which is arranged in the housing, and comprises a filter body, an open first end plate arranged on a end face and a second end plate arranged on the opposite end face, as well as a support tube attached to the housing which is concentrically arranged about the longitudinal axis inside the filter element and in particular serves for the radial support of the filter element.

In this context, the filter element with its second end plate is supported with anti-rotation action, resting on the support tube and abutting against an inner cover contour, and is thus firmly compressed between the support tube and the cover.

Due to the fixed support of the second end plate of the filter element, the support of the filter element itself in the housing is more robust and unambiguous with respect to environmental influences, for example, contamination with water, high air humidity and the resulting softening/deformation of the filter paper of the filter body during operation. This will moreover ensure reliable sealing between the area of the unfiltered and the area of the filtered medium, which can be maintained and be reliably restored both during operation as well as particularly also following the easy replacement of the filter element and/or the secondary element.

The filter body can consist of a zigzag folded (pleated) filter bellows, for example, as an annular closed configuration. For long filter bodies, the pleating can be produced by means of knife folding or by rotary folding, for example. The filter bellows can, for example, consist of paper or cellulose, or of a mixed fiber made of synthetic material and cellulose. The filter bellows can moreover be designed with a smooth surface, rolled and/or with a surface formed by different types of embossing to provide rigidity and/or create cavities for the deposition of dust. The filter bellows can be coated and/or impregnated in order to repel moisture. Alternatively, it can also be coated with nanofibers. For structural stability, the filter body may further be reinforced with a filament winding, at least one peripheral hot melt bead, or a lattice. A filament winding is understood to be a thread impregnated with hot melt adhesive and is wound around the periphery of the filter body formed by the outer edges of the pleats, wherein the thread stiffens and is connected with the peaks of the pleats during the curing of the hot melt adhesive. The filter element is generally designed as primary filter element; however, a secondary filter element may also be arranged on its clean side and/or in its interior.

Advantageously, the filter system can comprise a replaceable secondary element with an open end and a closed end, which is disposed inside the support tube and is mounted in a housing seat with its open end. For this purpose, the filter element can rest with the second end plate on the support tube and/or on the closed end of the secondary element and be supported, abutting against the inner cover contour, so as to be secured against rotation. In this context, the secondary element may be pressed into the housing seat; it may be pressed into the housing seat by the application of force by means of the second end plate. Because a high axial force component acts on the secondary element when closing the cover, it is ensured that the secondary element is always in its end position when the housing is closed by the cover. This ensures that the seal is reliably engaged. Moreover, during fabrication, attention does not have to be paid to whether the secondary element was installed in its end position, since this will be done by the cover at the latest, because when the cover is closed, a pressure force is transferred onto the secondary element by means of the second end plate of the filter element. Hence, this will ensure a secure end position of the secondary element with the cover installed. Furthermore in this manner, in addition to the support tube, the filter element is axially braced by the second end plate against the cover and thus against the housing and thereby experiences a fixed support on the end face, i.e., the end of the filter element near the cover.

Expediently, the support tube can have recesses on its end facing the second end plate, with which the second end plate is or can be interlocked. In addition, the clawing effect of the support tube into the material of the end plate makes the filter element less sensitive to vibration effects.

It is also advantageous, when the cover of the housing has rib-like protrusions, with which the second end plate of the filter element is or can be interlocked. The additional anti-rotation action of the clawing effect with the rib-like protrusions in the cover favors the vibration rigidity of the support of the filter element even more.

In an advantageous embodiment, the second end plate comprises an outer, central support surface, which preferably extends perpendicular to the center axis and/or longitudinal axis of the filter element. A parallel, inner support surface is more preferably formed by the inner face of the second end plate.

In a favorable embodiment, the second end plate can comprise support knobs for the transfer of axial and/or radial force between the cover and the second end plate. In this manner, the force exerted onto the end plate by closing the cover can be transferred through said end plate into the support tube, wherein this produces fixed mounting of the filter element.

Advantageously, the second end plate can also comprise support knobs for the transfer of axial and/or radial force between the cover and the secondary element. In this manner, the force exerted onto the end plate by the closing of the cover can be transferred through said end plate and into the secondary element, as a result of which it is again possible to press said secondary element firmly into its housing seat. Thus a fixed mounting of the secondary element and at the same time also a good seal between the unfiltered and the filtered area of the filter system is enabled.

Advantageously, the second end plate as well as the first end plate can consist of a polyurethane foam or an elastomer. Obviously, there is also the possibility to produce the end plate from several synthetic components, to thus ensure optimal deformability across a wide temperature range as it can occur in practical applications. This means that thermoplastic polymers are also not excluded. Both end plates can be welded or be bonded to the filter body to produce a solid connection.

The inner cover contour can be designed as an annular groove, for example, into which support knobs engage such that also a radial support on the radial walls of the groove is possible.

Preferably one central support knob in the area of the filter element is provided on the second end plate, and/or a plurality of annular or circular regularly or irregularly spaced eccentric support knobs are provided about the longitudinal axis. The support knobs are preferably designed in one piece with and/or of the same material as the second end plate (monolithic). The central support knob can preferably form the outer, central support surface. The radial position, i.e., the distance of the eccentric support knobs from the center of the second end plate, is preferably selected such that the eccentric support knobs are disposed in the direct axial continuation of a support tube of a corresponding housing. For this reason, the diameter of the circle on which the eccentric support knobs, preferably with their centers, are arranged, will preferably agree with the diameter of the support tube, preferably with the mean between the inside and outside diameter of the support tube. In other words, the eccentric support knobs are arranged on a circle having the diameter of the support tube, and/or the eccentric support knobs are radially arranged in the area of the cross-section of the support tube. For this purpose, the flux of force occurs purely axially from the support tube via the second end plate and its eccentric support knobs onto the inner cover contour of the cover.

The inner cover contour preferably comprises a plane surface at the center of the cover on which the central support knob can be supported. The second end plate is preferably designed elastically, at least in the area that is enclosed annularly by the filter body, such that the center area with a central support knob can be elastically forced outwardly by the second element until it abuts against the cover. Relative to the central support knob, the eccentric support knobs are then slightly moved in the direction of the open end plate during mounting of the cover. When the housing cover is then removed to change the filter element, the second end plate is slightly biased and facilitates the removal of the filter element from its seal seat that is subject to friction on the open end plate, since with the cover removed, traction is exerted onto the external areas of the second end plate and thus on the filter body.

In a further preferred embodiment, rib-like protrusions are provided in the inner cover contour, preferably in the annular groove, which preferably extend radially and more preferably slightly extend into the interior of the filter housing. The elastic material of the second end plate can interlock or claw into the protrusions so that the filter element is thereby secured against potential rotation if vibrations occur during operation. For this purpose, the protrusions will preferably press into the eccentric support knobs of the second end plate, thereby achieving a positive engagement in the direction of rotation around the longitudinal axis.

Pursuant to an advantageous development, also additional or alternative recesses on the end of the support tube facing the second end plate are conceivable, which likewise facilitate interlocking or clawing of the support tube with the second end plate in order to ensure anti-rotation action for the filter element in case of vibrations. For this purpose, the second end plate connects positively with the end of the second end plate facing the support tube, for example, an elastic second end plate can penetrate into the recesses by deformation and/or compression during the assembly so that a positive engagement is achieved in the direction of rotation about the longitudinal axis.

For this purpose, a further embodiment is advantageous, in which the second end plate is made for example from a cast material that is soft, compared to the housing material and the support tube material (both of which are normally injection molded thermoplastics, particularly with a percentage of glass fiber, or metal), preferably polyurethane foam or a similar elastic material, preferably with a hardness in the range of approximately 10-30 Shore A.

In one embodiment, the distance between the inside surface of the second end plate and the axial outside surfaces of the support knobs are preferably selected or designed the same or more preferably somewhat larger than the distance between the inside surface of the cover in the area of the longitudinal axis, i.e., in its center, and the axial end of the secondary element and/or between the inside surface of the cover in the area of the inner cover contour and of the support tube.

Particularly preferably, at least one of the cited distances on the second end plate is designed with an oversize of 1 mm-5 mm, preferably relative to the defined distances by the cover on the one hand, and the support tube as well as the secondary element, on the other hand. In this manner, a reliable fixed support of the filter element can be ensured.

Advantageously, the first end plate can comprise a radial seal with respect to the housing. This has the advantage that besides having a good seal and thus a secure filter effect, the radial seal as well as the axial bracing of the support knobs in the cover will produce a radial guidance of the filter element in the housing to create a very robust filter element mount in the housing.

The secondary element that is connected with the housing can conveniently remain in the housing during filter element replacement. In this way, it is ensured that the additional air duct connecting to the outlet of the filter housing is protected against contamination during the replacement procedure.

Advantageously, a cyclone separator can be provided near the filter system inlet, and a dirt outlet can be provided on the housing or on the cover. The guide geometry of the cyclone separator is such that it will cause the medium to be filtered to rotate. This rotation will concentrate the contamination in the vicinity of the housing wall, which will then be discharged by means of a dirt outlet at a convenient point. The service life of the actual filter element can be significantly extended by means of this pre-separation of the majority of contaminants from the air to be filtered.

The filter system can be expediently used as an air filter, in particular as an air filter of an internal combustion engine. The safe operation of internal combustion engines is also based on secure and optimal filtration of the induction air for the combustion operation. The described filter element provides an economical option therefor.

Using the filter system as a particle filter is also advantageous, in particular as a particle filter of an internal combustion engine. Here again, the safe installation and the economic option of replacing the described filter element are of crucial importance.

According to a further aspect, the invention relates to a filter element for installation in a filter system preferably with one or several features as described above and in the following, wherein the filter element is arranged in the housing of the filter system such that it can be replaced. Using such a filter element in the described filter system will ensure reliable sealing between the area of the unfiltered and the area of the filtered medium, which can be maintained during operation and particularly also can be reliably restored by means of a convenient filter element replacement.

The invention furthermore relates to a secondary element for installation into a filter system as described above, wherein the secondary element can be arranged in the filter system housing so that it can be replaced. Using such a filter element in the described filter system ensures reliable sealing between the area of the unfiltered and the area of the filtered medium, which can be maintained both during operation and particularly can be reliably restored after a convenient and easy filter element replacement.

BRIEF DESCRIPTION OF THE DRAWINGS

Further advantages result from the following description of the drawings. The drawings illustrate embodiments of the invention. The drawings, the description and the claims contain numerous features in combination. A person skilled in the art will expediently consider the features also individually, and combine them into further meaningful combinations.

Identical or similar components in the Figures are designated with the same reference symbols. The Figures merely show exemplary embodiments and are not to be understood as being limiting.

DESCRIPTION OF PREFERRED EMBODIMENTS

Figure 1:
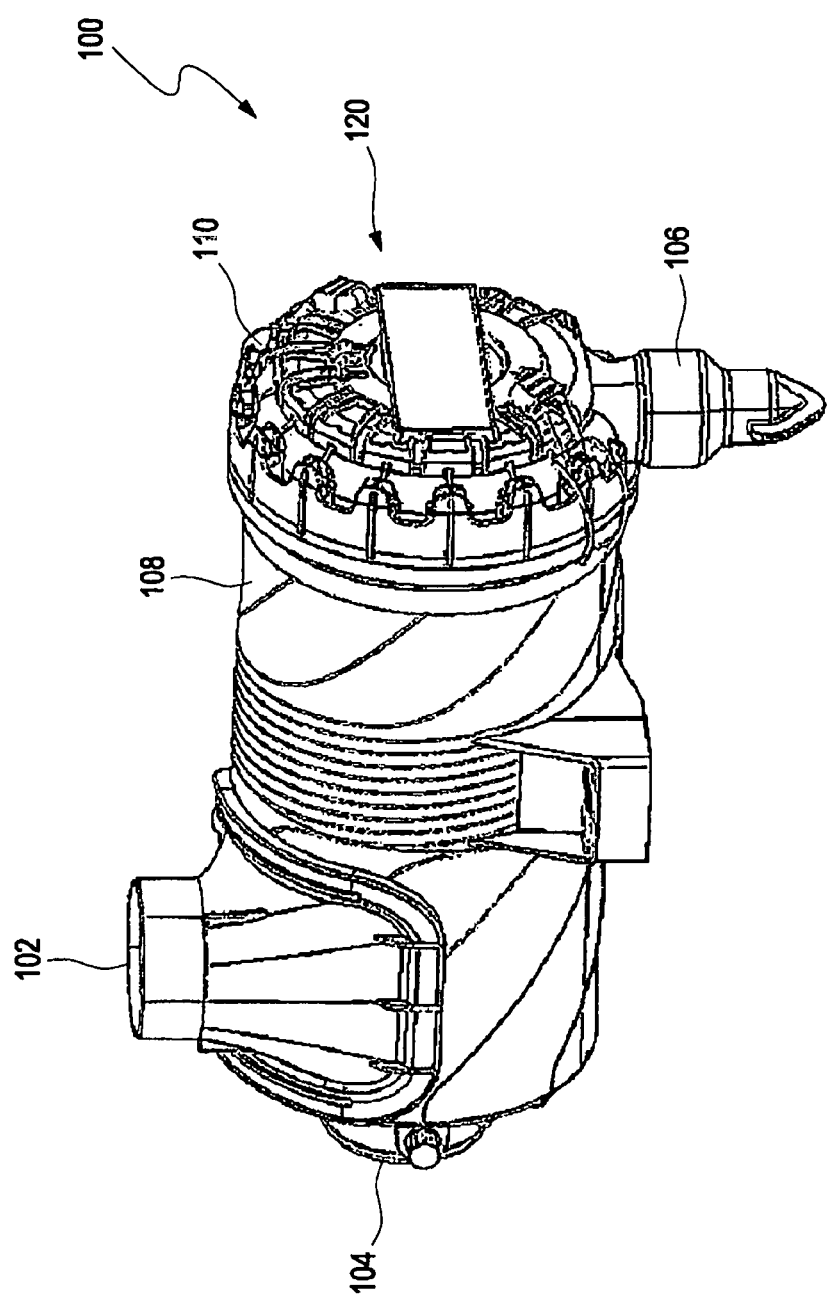
FIG. 1 is a perspective view of a filter system according to an embodiment of the invention with a tangential inlet, a central outlet, and a dirt outlet on the bottom.

FIG. 1 illustrates a perspective view of a filter system 100 according to an embodiment of the invention, with a tangential inlet 102, a central outlet 104, and a dirt outlet 106 at the bottom. Shown is a circular filter design that comprises a housing 108, which is closed with a cover 110 on one front face 120. In the air filter system, air loaded with dust flows through the inlet 102, which is arranged tangentially to the housing wall and to the air filter element that is installed on the inside, also tangentially into the flow chamber receiving the untreated flow which surrounds the annular air filter element so that the air inside the housing 108 is put into a rotary motion. A direct ingress of the air through inlet 102 into the pleats of the air filter element present in the inlet area is prevented by a baffle plate on the filter element, which is formed, for example, by the one filter element in the inflow area which is designed as a film as part of the filter element and surrounds the annular filter element in the inflow area. The baffle plate can alternatively also be formed by a wall that surrounds the filter element in the annular influx area and extends from the axial housing wall on the outlet side into the filter housing interior. The filter element and the baffle plate are not represented in the drawing. Because of the cyclone effect resulting from the rotary motion of the air, centrifugal forces act on the dust particles of the airflow so that they can partially separate on the housing wall and flow out from the filter system 100 via the dirt outlet 106. This results in reduced loading of the filter element. The purified air can be discharged from the housing 108 by means of the central outlet 104.

Figure 2:
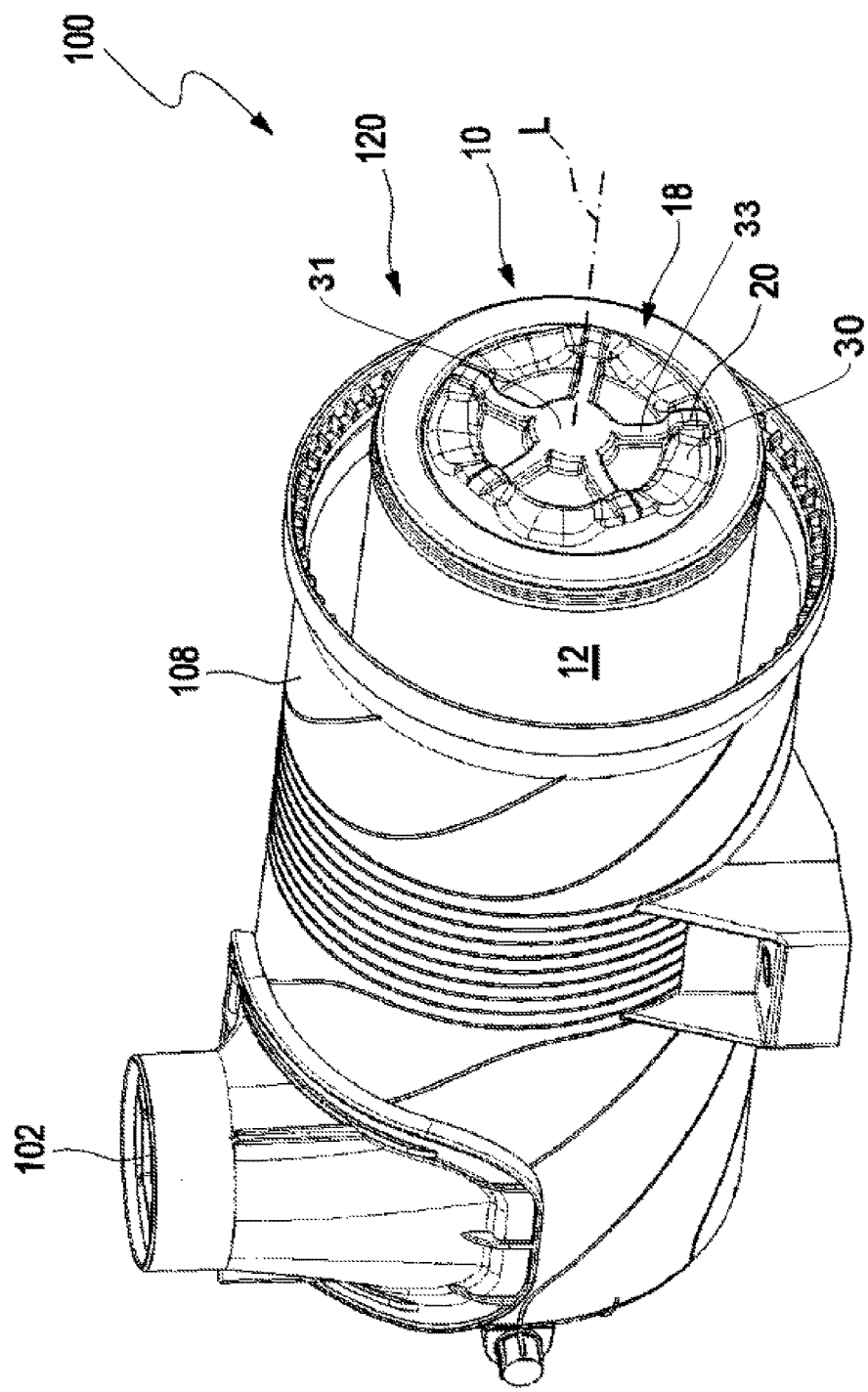
FIG. 2 is a perspective view of a filter system according to an embodiment of the invention with the cover of the housing removed.

FIG. 2 is a perspective view of a filter system 100 according to an embodiment of the invention with the cover of the housing 108 removed. In the interior of the housing 108, a fitted filter element 10 is shown with a filter body 12 that is closed with a second end plate 18. The second end plate 18 may include a circumferentially extending projection 30 which may form an annular ring 30 encircling the longitudinal axis L. Support knobs 20 for supporting the end plate 18 on a cover (not shown) are visible on the face of the second end plate 18 facing the front face 120 at the open end of the housing 108. The support knobs 20 may be arranged on the circumferentially extending projection 30. A plurality of radially extending ribs 33 of elastically deformable material may be formed on and projecting axially outwardly from the axially outer face of the second end plate 18. Each of the plurality of radially extending ribs 33 extends radially between the central support knob 31 and respective ones of the plurality of eccentric support knobs 20. The plurality of radially extending ribs 33 may have a first end directly contacting the central support knob 31, and an opposite second end directly contacting the circumferentially closed ring 30.

Figure 3:
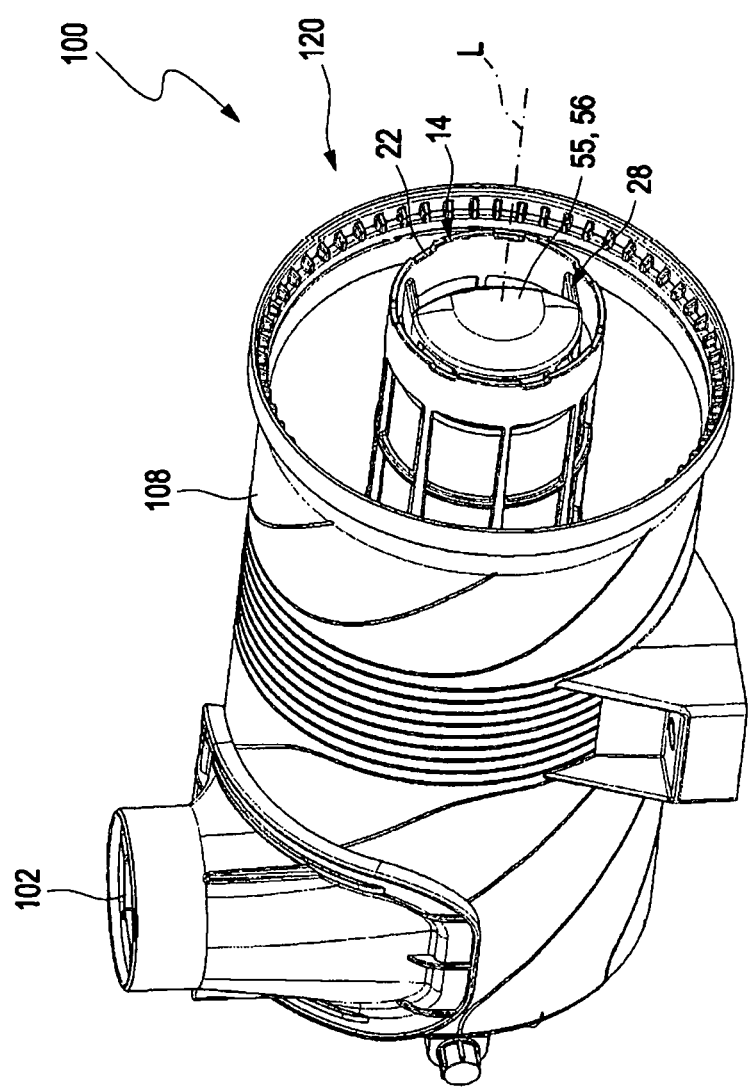
FIG. 3 is a perspective view of a filter system according to FIG. 2, but with the filter element removed so that a support tube can be seen.

FIG. 3 illustrates a further perspective view of a filter system 100 according to FIG. 2, with the filter element removed. A support tube 14 attached to the housing can be seen at the open end (the front side 120) of the housing 108; the support tube 14 is disposed inside the filter element (when the filter element is installed) and supports it radially on its inner side and protects it from collapsing. If the system is not in operation, however, the support tube is spaced from the filter body not being flowed through. As a result, assembly of the filter element is facilitated because there is no added friction, and the risk of damaging the filter medium during the installation of the filter element 10 is reduced. A secondary element 28 is provided inside the support tube 14 concentrically to the longitudinal axis of the filter system 100. The closed end 55 of the secondary element 28 can be seen, which is designed as a handle 56 for easy removal of the inserted secondary element 28 from the housing 108 and/or from the support tube 14.

Figure 4:
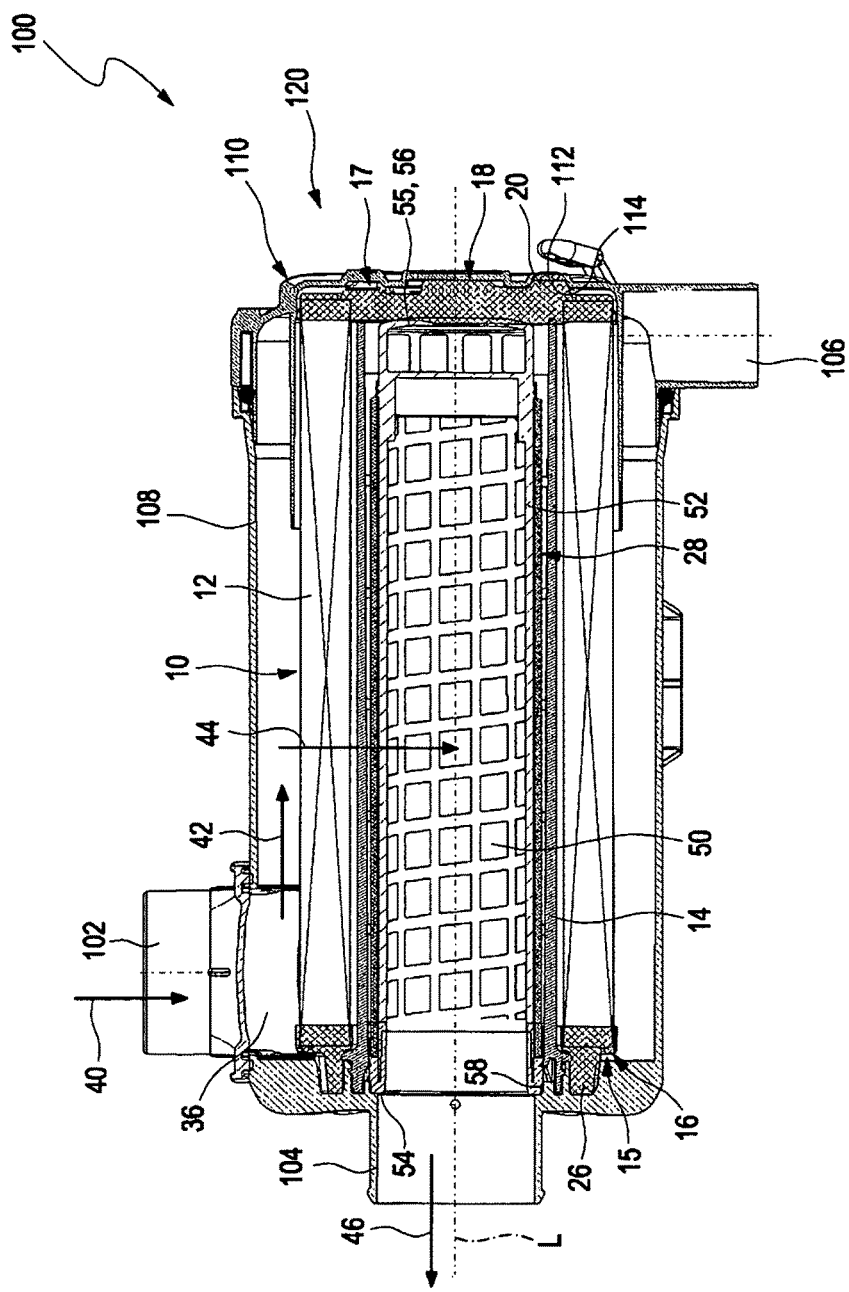
FIG. 4 is a longitudinal section through a filter system according to an embodiment of the invention.

FIG. 4 illustrates a longitudinal section through a filter system 100 according to an embodiment of the invention that has a tangential inlet 102, a central outlet 104, and a dirt outlet 106 on the bottom. The front face 120 of the housing 108 of the filter system 100 is closed with a cover 110. A filter element 10, which comprises a filter body 12 that is concentric around the longitudinal axis L, is closed off at the two opposing end faces 15, 17 with an open first end plate 16 and a second end plate 18, which can be made of polyurethane foam or of an elastomer, for example. The filter body 12 can consist of a zigzag folded (pleated) filter bellows, for example, of a closed ring shape. For longer filter bodies 12, the pleating can be produced by knife folds or by rotary folding, for example. The filter bellows can consist of paper, cellulose or of a mixed fiber made of synthetic material and cellulose and be designed with a smooth surface or a surface that is rolled and/or with a surface with different types of embossing to provide rigidity and/or create cavities for the deposition of dust. The filter bellows can comprise a coating and/or impregnation to repel moisture. Alternatively, it can also be coated with nanofibers. The filter body 12 can further be reinforced with a filament winding for structural stability.

The second end plate 18 comprises support knobs 20, which are disposed so as to extend axially outward and which, when installed in the receiving housing 108, are supported on the housing 108, specifically on the cover 110 of the housing 108, preferably in the area of an inner cover contour 114 of the cover 110 abutting axially. The inner cover contour 114 is embodied e.g. as an annular groove in an area where the support knobs engage so that radial support on the radial walls of the groove is also possible. Preferably, on the second end plate 18, a central support knob 202 in the area of the longitudinal axis L of the filter element 10 and a plurality of regularly or irregularly spaced apart eccentric support knobs 20 are arranged annularly or circularly about the longitudinal axis L. The support knobs are preferably designed in one piece (monolithic) and/or are made of the same material as the second end plate 18. The radial position, i.e., the distance of the eccentric support knobs 20 from the center of the second end plate 18, is preferably selected such that the eccentric support knobs 20 are disposed in direct axial continuation of the support tube 14. For this reason, the diameter of the circle on which the eccentric support knobs 20 are preferably arranged with their centers, will preferably correspond to the diameter of the support tube 14, preferably with the mean between the inside and outside diameter of the support tube 14. In other words, the eccentric support knobs 20 are arranged on a circle having the diameter of the support tube 14, and/or the eccentric support knobs 20 are radially arranged in the area of the cross-section of the support tube 14. The inner cover contour 114 preferably comprises a plane surface in the center of the cover 110, on which the central support knob 202 can be supported. The second end plate 18 is preferably designed elastically, at least in the area that is enclosed annularly by the filter body 12, such that the center area with the central support knob can be elastically forced outward by the secondary element 28, until it abuts against the cover. During the assembly of the cover 110, the eccentric support knobs 20 are moved slightly relative to the central support knob 202 in the direction of the open end plate 16. When the housing cover 110 is then removed for changing the filter element, the second end plate 18 is slightly biased and facilitates the removal of the filter element 10 from its frictional seal seat on the open end plate 16.

The support tube 14 is concentrically arranged about the longitudinal axis L in the inside 50 of the filter element 10 and the end of the support tube 14 arranged at the outlet is firmly connected with the housing 108, for example, with a snap connector, or by bonding or welding. The face of the second end plate 18 facing the support tube 14 abuts on the open end of the support tube 14 facing the end plate 18. When the inner contour 114 of the cover 110 presses against the end plate 18 when the cover 110 is closed, this force is passed via the support knobs 20 into the disk 18 that is supported on the support tube 14. In this context, the flux of force occurs purely axially from the support tube 14 via the second end plate 18 and its eccentric support knobs 20 onto the inner cover contour 114 of the cover 110. In this manner, the filter element 10 is braced axially by means of the second end plate 18 against the cover 110 and therefore against the housing 108, and thereby experiences fixed support on the end face 17, i.e., the end of the filter element 10 near the cover, particularly without loading the filter body 12 with axial forces.

Furthermore, in the inner cover contour 114, preferably in the annular groove, rib-like protrusions 112 are provided which preferably extend radially and more preferably slightly extend into the interior of the filter housing. The elastic material of the second end plate 18 can interlock or claw into these protrusions 112 so that the filter element 10 is thereby secured against potential rotation caused by vibrations during operation. For this purpose, the protrusions 112 will preferably press into the eccentric support knobs 20 of the second end plate 18, thereby achieving a positive engagement in the direction of rotation around the longitudinal axis L. Furthermore, it is also conceivable that recesses 22 are provided on the end of the support tube 14 facing the second end plate 18, by means of which further interlocking or clawing of the support tube 14 with the end plate 18 is enabled in order to ensure additional anti-rotation protection for the filter element 10 caused by vibrations. For this purpose, the second end plate 18 presses itself into the recesses 22 and achieves a positive engagement in the direction of rotation around the longitudinal axis L. To make the above-described possible, it is preferable to use a second end plate 18 made, for example, from a cast material that is soft, compared to the housing material and the support tube material (both of which are normally injection molded thermoplastics, particularly with a percentage of glass fiber, or metal). Preferably, the end disk 18 is made of polyurethane foam or a similar elastic material, preferably with a hardness in the range of approximately 10-30 Shore A.

The distance between the inside surface of the second end plate 18 and the axial outside surfaces of the support knobs 20, 202 is preferably selected or designed the same or more preferably somewhat larger than the distance between the inside surface of the cover 110 in the area of the longitudinal axis, i.e., at its center, and the axial end of the secondary element 28 and/or between the inside surface of the cover 110 in the area of the inner cover contour 114 and the support tube 14. Particularly preferably, at least one of the cited distances on the second end plate 18 are designed with an oversize of 1-5 mm, preferably relative to the distances defined by the cover 110, on the one hand, and the support tube 14 or the secondary element 28, on the other hand. In this manner, a reliable fixed support of the filter element 10 can be ensured.

In case that the second end plate 18 is produced from a cast polyurethane foam or a similar elastic material, as preferred, the thickness of the second end plate 18 and thus also the above-mentioned distances defined by the second end plate can be easily adjusted by the quantity of the polyurethane that is metered into the casting mold. In this context, the casting mold is open on the one side and accepts the filter body prior to metering of the polyurethane, wherein the casting mold uniquely defines the outward facing form of the second end plate 18, and the inside surface is formed by the freely foaming and subsequently curing polyurethane in the casting mold. The degree of potential elastic compression is apparent in all areas from FIGS. 7 and 8, respectively; these drawings illustrate for improved visibility slightly excessive material collisions which, in reality, result in elastic deformations, here essentially of the material of the end plates.

On the opposite end face 15 of the filter element 10, a radial seal 26 is fitted onto the first end plate 16; by means of the seal 26 the unfiltered air space and the filtered air space of the filter element 10 are sealed relative to each other.

Dust-bearing air can flow in through the inlet 102 in the direction of arrow 40, which in this case is present as a tangential inlet and which facilitates a cyclone operation as a result of the rotational movement of the air caused by the cyclone separator 36. Dust particles, some of which have been partially pre-separated by the rotational movement, can deposit on the inner housing wall and be emptied from the filter system 100 through the dirt outlet 106 in downward direction by gravity, when the filter housing 108 is installed horizontally. After partial separation of the dust particles, the air flows through the filter body 12 in direction of arrow 42, 44 into the inside 50 of the filter element. Depending on the filter medium, dust particles above a certain size are retained in the filter medium. Depending on the dust input, it is therefore necessary to replace the filter element 10 after a certain service life. The filtered air flows out through the outlet 104 in direction of the arrow 46.

In the inside 50 of the filter element 10, a secondary element 28 is provided which essentially consists of a support structure, i.e., the body 52 provided with a relatively permeable filter medium, for example a fleece, and which during the replacement of the filter element 10 remains in the housing 108 for protection of the downstream air passage of an internal combustion engine, for example, from dust particles and other items that may intrude. The open end 54 of the secondary element 28 is inserted into a housing seat 58 at the outlet section of the housing 108. The second end plate 18 of the filter element 10 abuts against the closed end 55 of the secondary element 28 in the area of its center and/or of the longitudinal axis as well as of the central support knob 202. As a result of this, a force is transmitted by means of the central support knob 202 of the end plate 18 into the closed end of the secondary element 28 when the housing cover 110 is closed. The secondary element 28 is therefore firmly pressed into its housing seat 58 by said force. The closed end of the secondary element 28 may be designed as a handle 56, for example, for the purpose of removing the secondary element from the housing seat 58 and therefore from the housing 108.

In this manner, in addition to the support tube 14, the filter element 10 is additionally braced axially by means of the second end plate 18 against the cover 110 and therefore against the housing 108 and thereby experiences fixed support on the end face 17 of the filter element 10, i.e., the end that is facing the cover 110. However, it is also conceivable to design the length of the support tube 14 and of the secondary element 28 in each case such that the second end plate 18 abuts exclusively against the secondary element 28 or against the support tube 14. Preferred is however a design that permits that the second end plate 18 can abut both against the secondary element 28 as well as against the support tube 14, because individual applications of an air filter according to the invention are conceivable that have no secondary element 28. A solution in which the second end plate 18 abuts exclusively against the secondary element 28 would be conceivable for applications in which a rotation of the filter element 10 in operation is noncritical, or is impeded by other means.

The filter element 10 can be deployed as an air filter, in particular as an air filter of an internal combustion engine. In principle, however, its use as a particle filter with a similar structural design is also conceivable.

Figure 5:
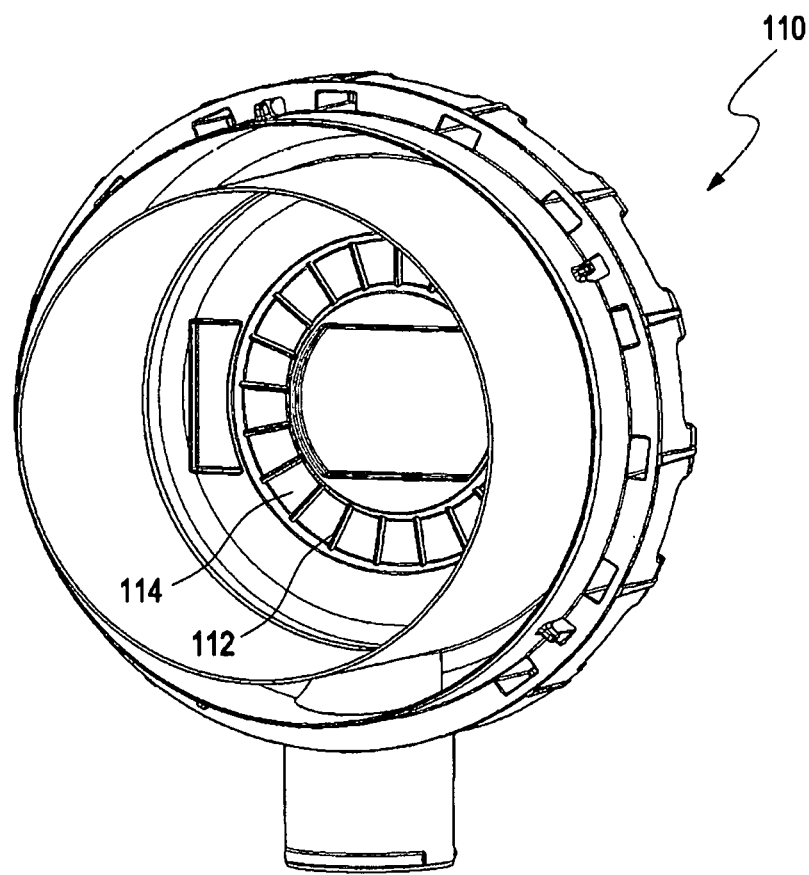
FIG. 5 is an interior view of a cover of a housing according to an embodiment of the invention.

FIG. 5 shows an inside view of a cover 110 of a housing of a filter system with rib-like protrusions 112 in the inner cover contour 114 according to an embodiment of the invention. By interlocking with the support knobs of a second end plate of a filter element, the filter element can be prevented from rotating during operation, even in case of potential vibrational excitation.

Figure 6:
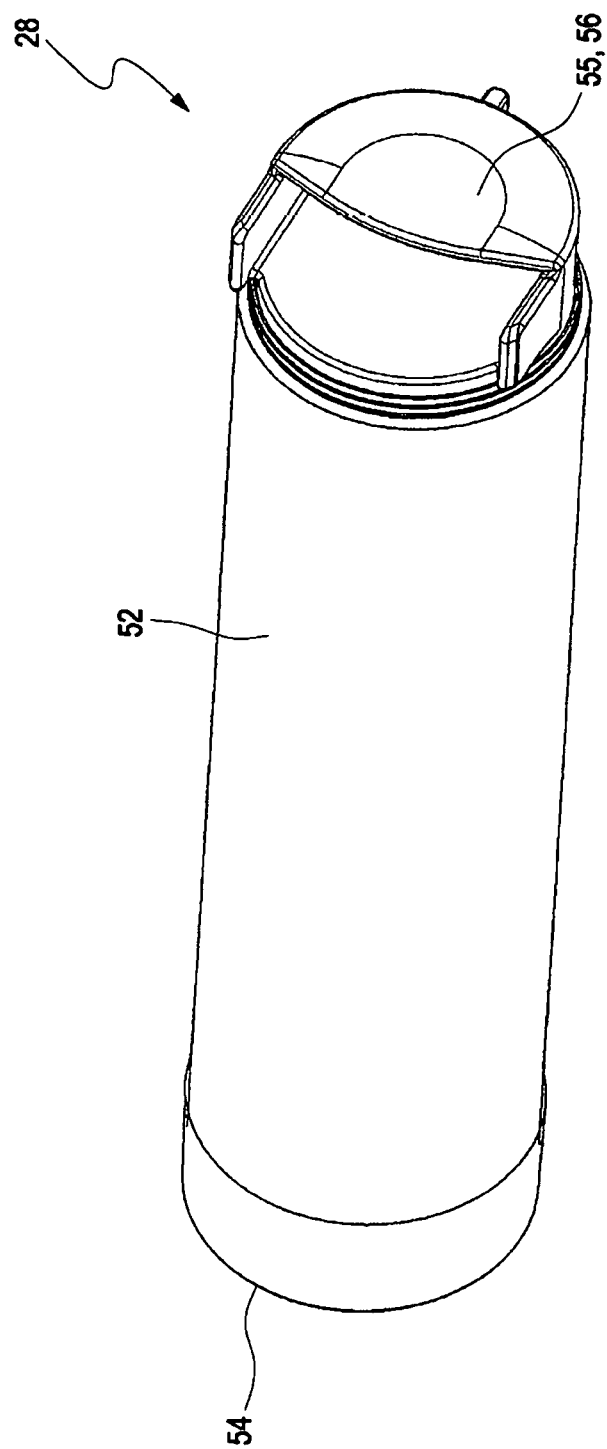
FIG. 6 is a perspective view of a secondary element according to an embodiment of the invention.

FIG. 6 is a perspective view of a secondary element 28 according to an embodiment of the invention. The cylindrical body 52 of the secondary element 28 is open at the end 54 where the outlet is located in order to discharge the medium that has been filtered; the cylindrical body 52 is closed at the other end 55 and has a handle 56 for removal of the secondary element 28 from the housing of the filter system. On this closed end 55, in particularly on the handle 56, the second end plate 18 of the filter element can be supported and thus transmit forces into the secondary element 28 in order to press the secondary element 28 into the housing seat and thereby also seal the unfiltered medium space against the filtered medium space inside of the secondary element 28.

Figure 7:
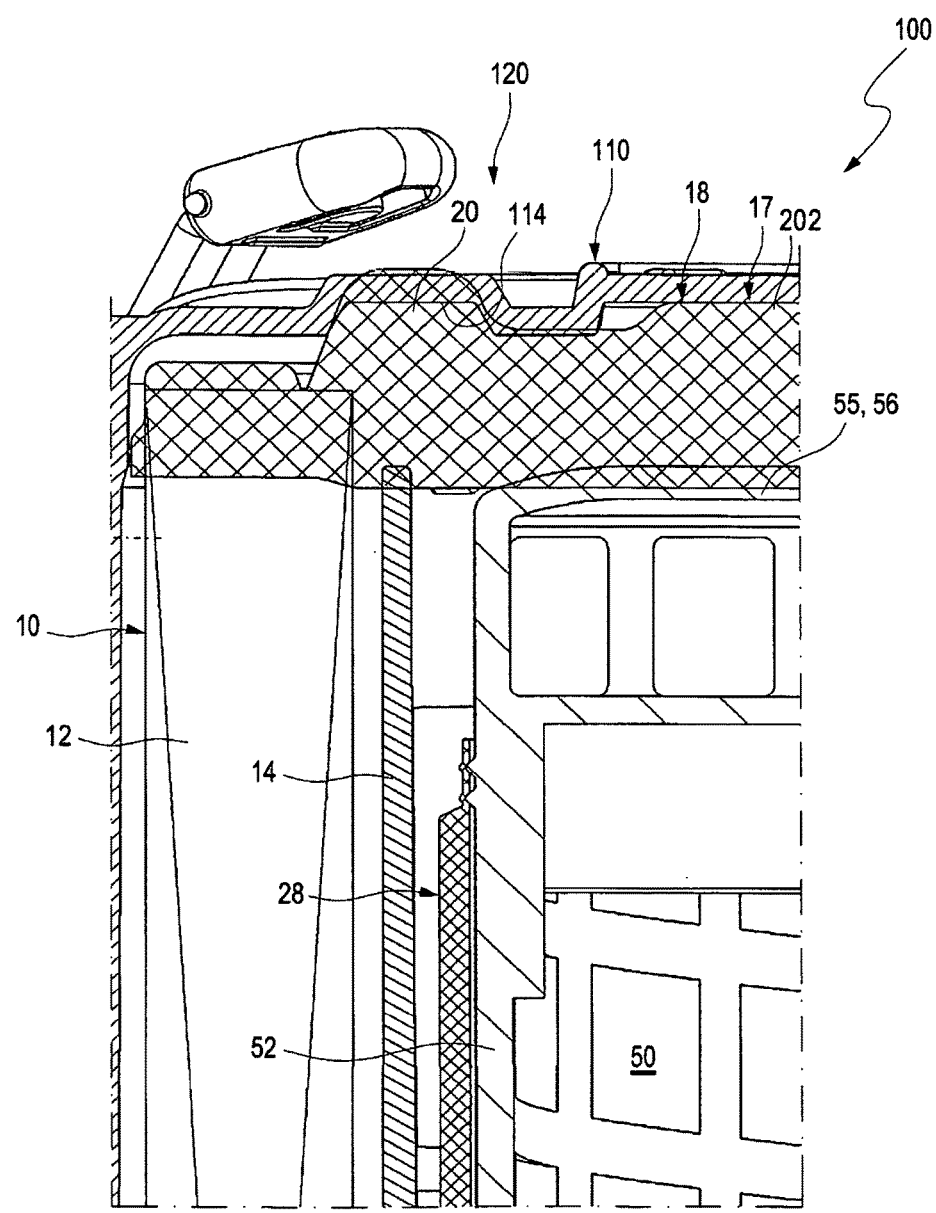
FIG. 7 is a cross section through the cover section of a filter system according to an embodiment of the invention.

FIG. 7 shows a cross section through the cover area of a filter system 100 according to an embodiment of the invention. It illustrates a part of the filter element 10, consisting of filter body 12 and the second end plate 18, as well as the support tube 14 mounted on the housing inside the filter element 10 and the secondary element 28 that is also fitted into a housing seat. After mounting the filter element 10 in the housing 108 and closing the cover 110 on the front face 120, said cover 110 presses onto the second end plate 18 via the support knobs 20. On the other side, the end plate 18 presses onto the end of the support tube 14 facing the end plate 18 and onto the closed end 55 of the secondary element 28 provided with the handle 56. For this purpose, the drawing illustrates the penetration of the cover 110, the support tube 14, and the secondary element 28 into the end plate 18. Because the material of the end plate 18 is expediently polyurethane foam or a similar elastic material, the end plate 18 is actually compressed between cover 110, support tube 14 and secondary element 28, and, in this way, transmits the force from the cover 110 onto the support tube 14 and the secondary element 28. In this manner, the filter element 10 is tightly clamped by means of the end plate 18 and is therefore also firmly supported. End plate 18 moreover also firmly presses the secondary element 28 into its housing seat.

Figure 8:
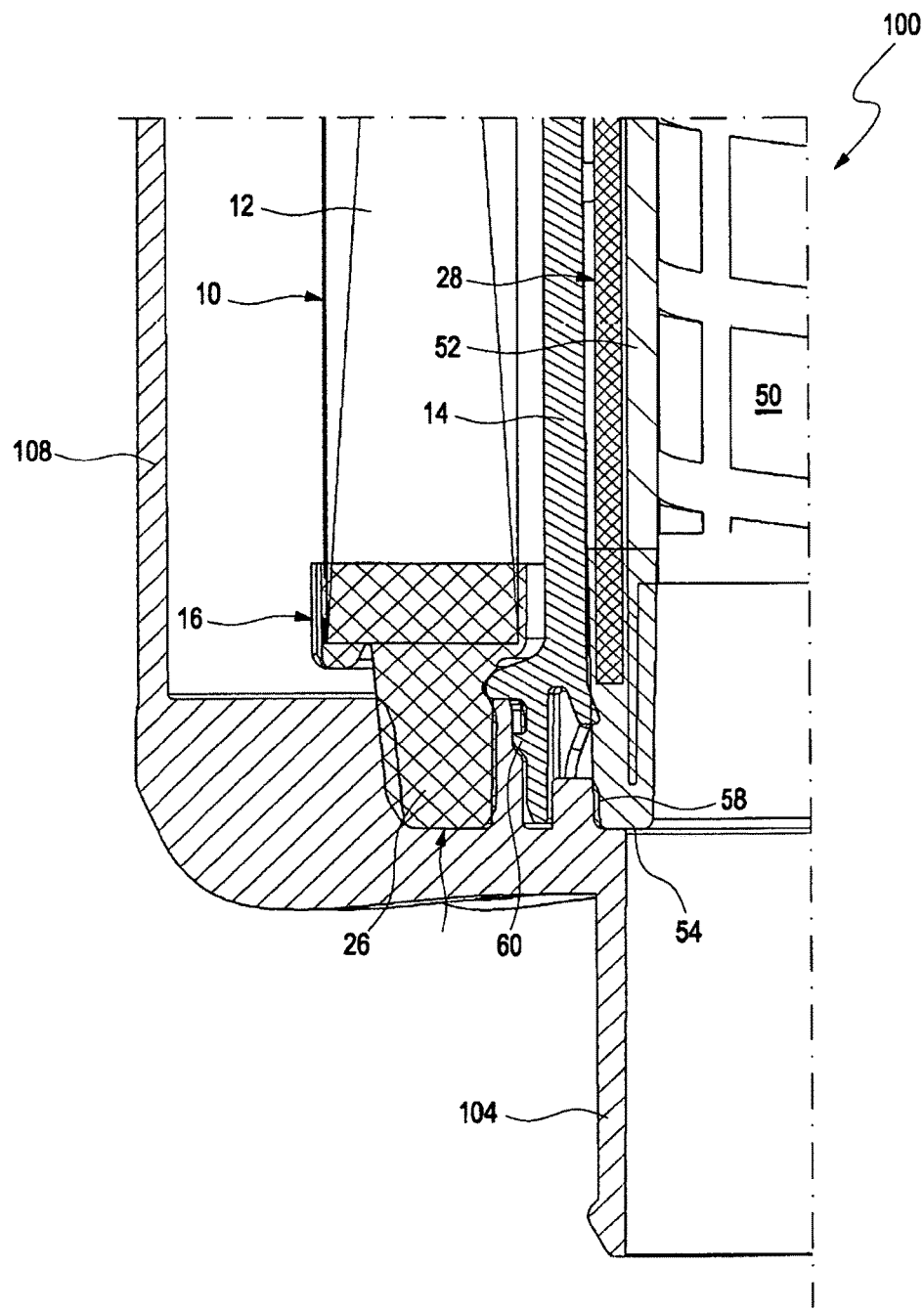
FIG. 8 is a cross section through the outlet section of a filter system according to an embodiment of the invention.

FIG. 8 is a cross section through the outlet section 104 of a filter system according to an embodiment of the invention. On the one hand, it can be seen that, on the opposite end face 15 of the filter element 10, a radial seal 26 is fitted onto the first end plate 16. The seal 26 seals the unfiltered air space relative to the filtered air space of the filter element 10. On the other hand, in this cross-section it can be clearly seen how the support tube 14 is fixedly connected with the housing 108 by means of a latch connection 60. The secondary element 28 is inserted into a housing seat 58, however, and for that reason is expediently pressed into the housing seat 58 by means of the closed end and the second end plate of the filter element. FIG. 8 further shows a flexible film that is embodied as a baffle plate. It is represented in the form of a bold line at the end of the reference arrow 10. The film is applied around the outer circumference of the filter body 12 across the outer lateral surface of the filter body 12 and is connected to an endless annular semi-finished product along a seam, for example, using an ultrasonic weld seam, and is embedded into the second end plate.

While specific embodiments of the invention have been shown and described in detail to illustrate the inventive principles, it will be understood that the invention may be embodied otherwise without departing from such principles.

What is claimed is:

1. An air filter system for intake air of an internal combustion engine, the air filter system comprising:
   a housing having a longitudinal axis, the housing having a first front face and a second front face;
   a cover closing off the first front face of the housing, the cover having an inner cover contour having a plurality of radially extending rib-like protrusions, the rib-like protrusions protruding axially inwardly from the cover towards an interior of the housing;
   an inlet arranged on the housing and adapted to feed a medium to be filtered into the housing;
   an outlet arranged on the housing and adapted to discharge the medium that has been filtered from the housing;
   a replaceable filter element arranged in the interior of the housing;
   the filter element comprising an annular filter body of a filter medium having a first axial end face and a second axial end face opposite the first axial end face;
   the filter element further comprising
      an open first end plate arranged at the first axial end face; and
      a second end plate arranged at the second axial end face;
      a circumferentially extending projection formed on an axially outer face of the second end plate and extending circumferentially about the longitudinal axis (L) and protruding axially outwards from the axially outer face of the second end plate,
         wherein elastically deformable material of the circumferentially extending projection comprises an polyurethane foam or other elastic material,
         wherein the elastically deformable material of the circumferentially extending projection deformably interlocks with or claws into the rib-like protrusions, securing the filter element against rotation in the housing and supporting the filter element on the cover.

2. The air filter system according to claim 1, wherein the circumferentially extending projection is a annular ring formed on the axially outer face of the second end plate and extending circumferentially about the longitudinal axis and protruding axially outwards from the axially outer face of the second end plate.

3. The air filter system according to claim 1, further comprising:
   a support tube arranged concentrically about the longitudinal axis in the housing, the support tube comprising a first end and a second end opposite the first end, wherein the first end is attached to the housing, wherein the support tube is arranged in an interior of the filter element and radially supports the filter body of the filter element.

4. The air filter system according to claim 2, wherein:
   the circumferentially extending projection forms a plurality of eccentric support knobs spaced apart circumferentially on the circumferentially extending projection and protruding axially outwards from the axially outer face of the second end plate, wherein the plurality of eccentric support knobs are configured to transmit axial and/or radial forces between the cover and the second end plate of the filter element.

5. The air filter system according to claim 1, further comprising:
 a replaceable secondary element comprising an open end and a closed end opposite the open end,
 wherein the secondary element is disposed in an interior of the filter element,
 wherein the open end is seated in a housing seat of the housing,
 wherein the closed end of the secondary element is arranged proximate to the second end plate of the filter element.

6. The air filter system according to claim 5, wherein:
 the second end plate of the filter element rests on the closed end of the secondary element, the closed end of the secondary element engaging the second end plate securing the secondary element against rotation relative to the filter element and forces the secondary element into the housing seat.

7. The air filter system according to claim 4, wherein:
 the eccentric support knobs are arranged on a circle, the circle arranged radially aligned with the second axial end face of the annular filter body.

8. The air filter system according to claim 1, wherein the second end plate consists of a polyurethane foam or an elastomer.

9. The air filter system according to claim 1, wherein the elastically deformable material of the circumferentially extending projection forms a circumferentially closed ring on the axially outer face of the second end plate of the filter element.

10. An air filter element for an air filter system, comprising:
 an annular filter body of a filter medium circumferentially closing about a longitudinal axis, the annular filter body having a first axial end face and a second axial end face opposite the first axial end face;
 an open first end plate arranged at the first axial end face;
 a second end plate arranged at the second axial end face;
 a circumferentially extending projection formed on an axially outer face of the second end plate and extending circumferentially about the longitudinal axis (L) and protruding axially outwards from the axially outer face of the second end plate,
 wherein elastically deformable material of the circumferentially extending projection comprises an polyurethane foam or other elastic material,
 wherein the elastically deformable material of the circumferentially extending projection is configured to deformably interlock with or claws into rib-like protrusions provided in a filter housing into which the filter element can be replaceably installed, securing the filter element against rotation in the filter housing and supporting the filter element on an interior of the housing;
 wherein the elastically deformable material of the circumferentially extending projection forms a circumferentially closed ring on the axially outer face of the second end plate of the filter element, the circumferentially closed ring extending circumferentially about the longitudinal axis and protruding axially outwards from the axially outer face of the second end plate;
 wherein the elastically deformable material of the circumferentially extending projection forms a plurality of eccentric support knobs on the circumferentially closed ring, the eccentric support knobs spaced apart circumferentially and projecting axially outwardly from the circumferentially closed ring;
 wherein the plurality of eccentric support knobs are configured to transmit axial and/or radial forces between the housing and the second end plate of the filter element.

11. The air filter element according to claim 10, wherein the eccentric support knobs are arranged on a circle, the circle arranged radially aligned with the second axial end face of the annular filter body.

12. The air filter element according to claim 10, wherein the second end plate consists of a polyurethane foam or an elastomer.

13. The air filter element according to claim 10, further comprising:
 a central support knob of elastically deformable material formed on the axially outer face of the second end plate, arranged centrally on the longitudinal axis (L), and projecting axially outwardly from the axially outer face of the second end plate.

14. The air filter element according to claim 13, further comprising:
 a plurality of radially extending ribs of elastically deformable material formed on and projecting axially outwardly from the axially outer face of the second end plate;
 wherein each of the plurality of radially extending ribs extends radially between the central support knob and respective ones of the plurality of eccentric support knobs.

15. The air filter element according to claim 14, wherein the plurality of radially extending ribs has a first end directly contacting the central support knob, and an opposite second end directly contacting the circumferentially closed ring.

* * * * *